April 7, 1959 B. R. BABBITT ET AL 2,880,988
APPARATUS FOR REDUCING FERRUGINOUS ORES CONTAINING
SUBSTANTIAL AMOUNTS OF MANGANESE
Filed May 19, 1954 5 Sheets-Sheet 3
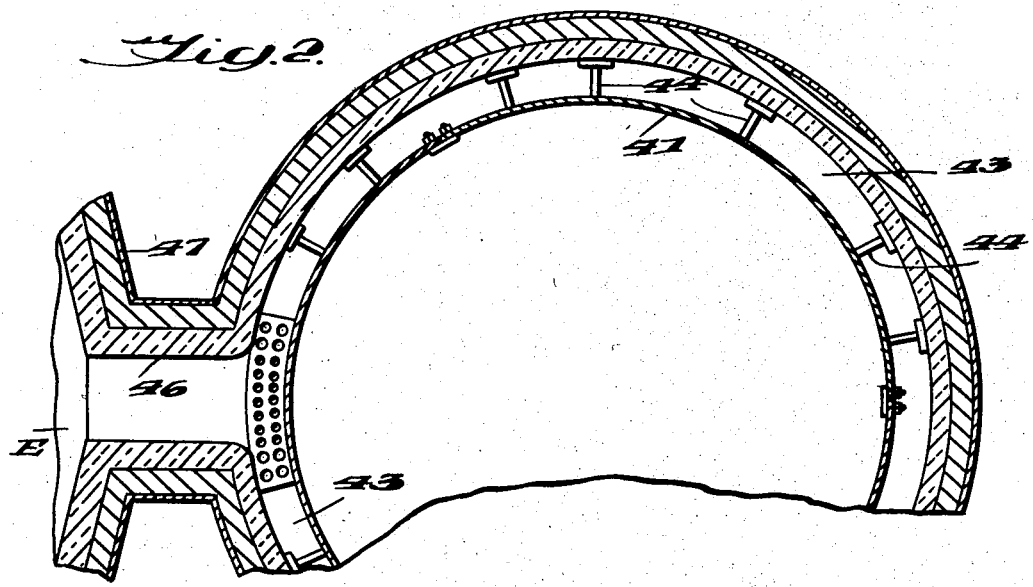
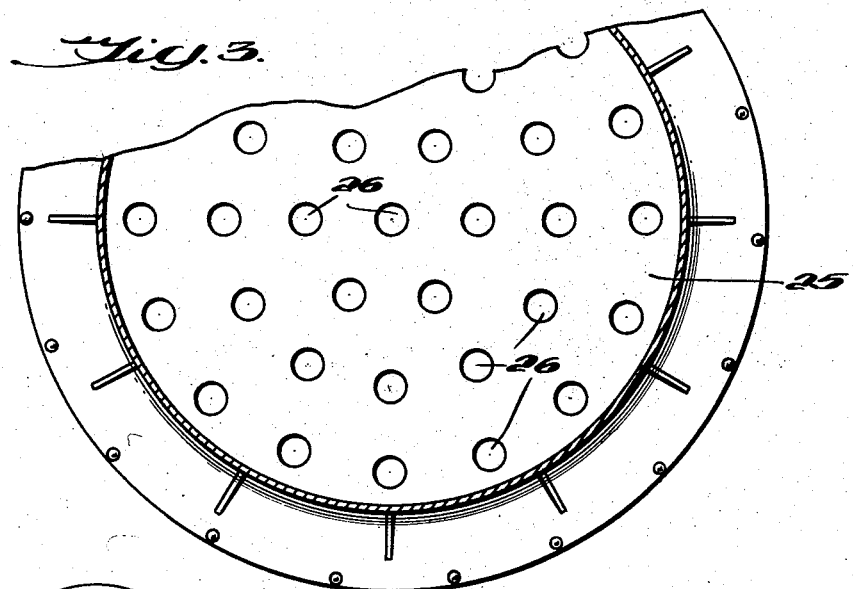
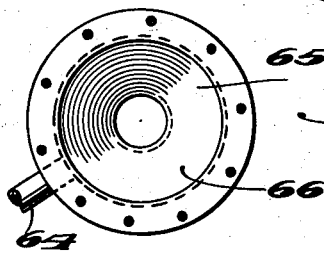

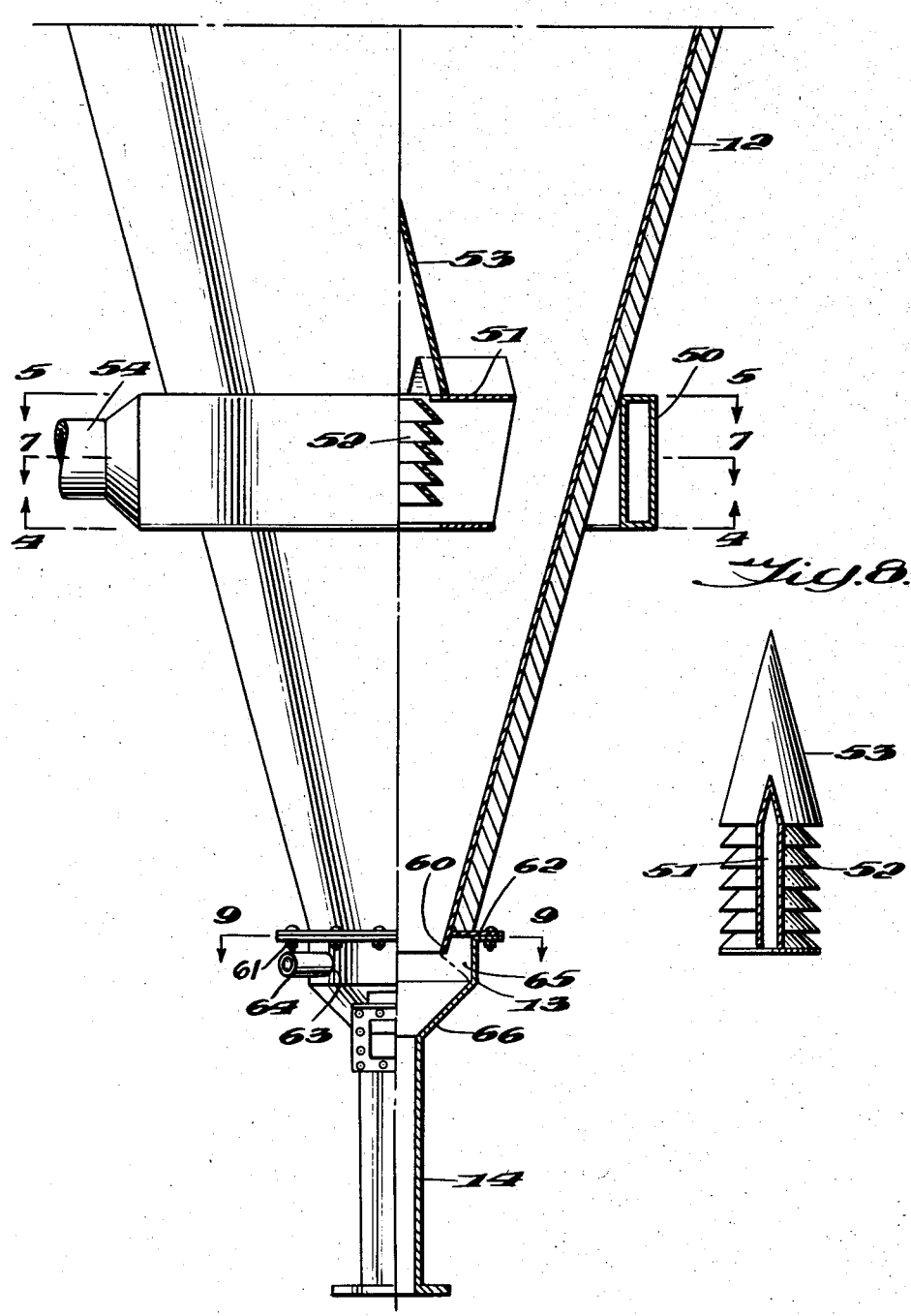

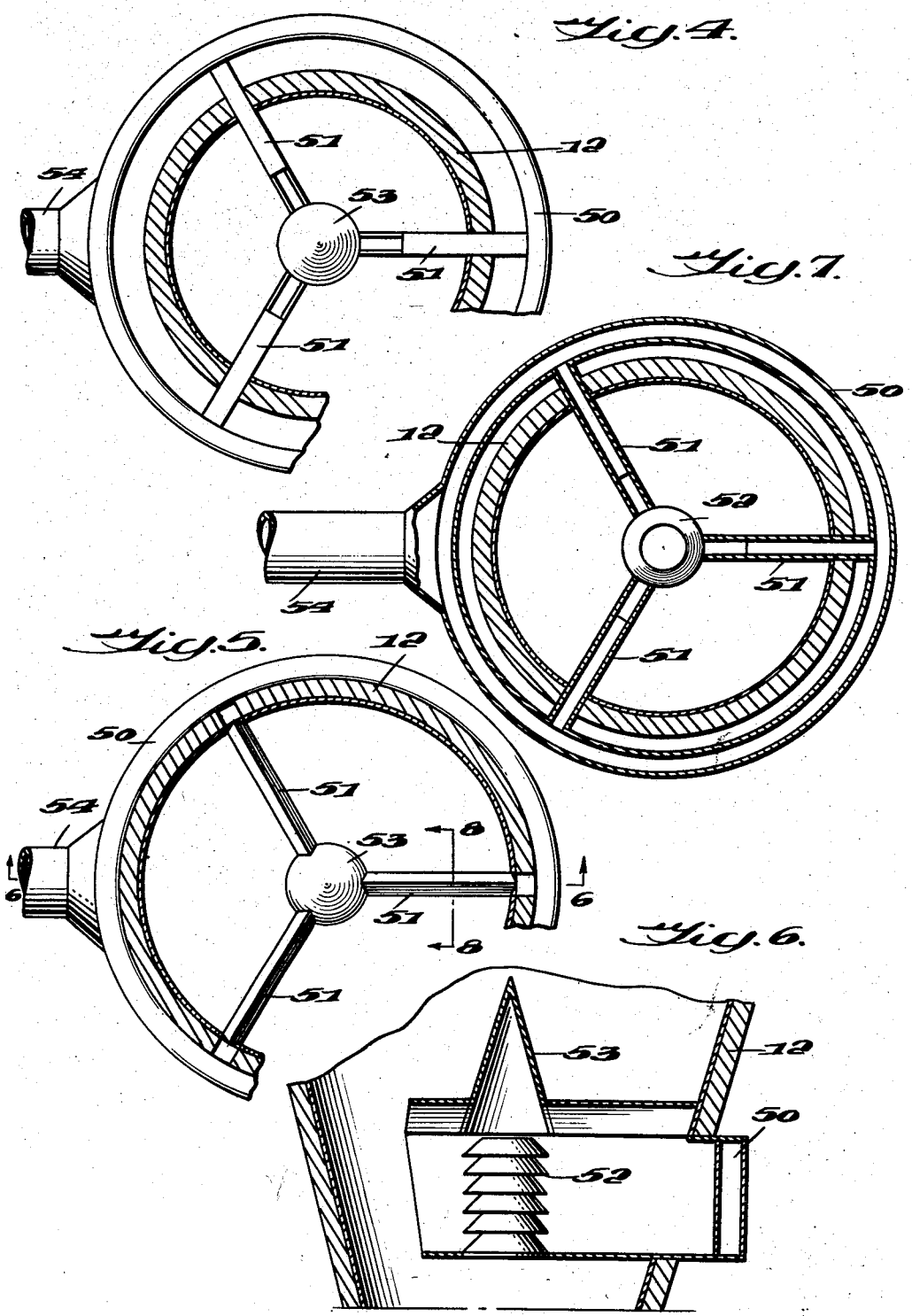

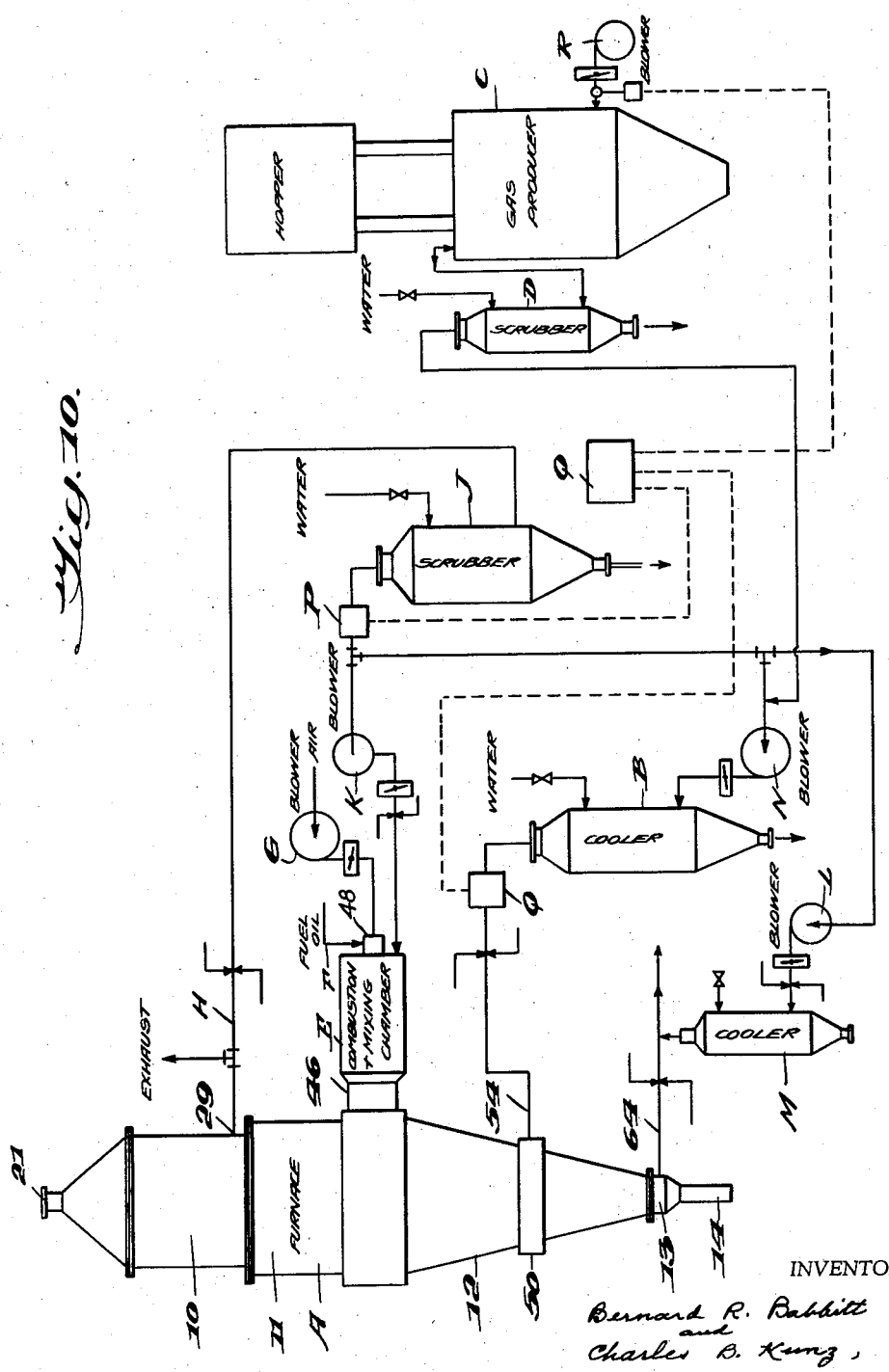

United States Patent Office 2,880,988
Patented Apr. 7, 1959

2,880,988

APPARATUS FOR REDUCING FERRUGINOUS ORES CONTAINING SUBSTANTIAL AMOUNTS OF MANGANESE

Bernard R. Babbitt, Minneapolis, and Charles B. Kunz, Brainard, Minn., assignors to Manganese Chemicals Corporation, Minneapolis, Minn., a corporation of Minnesota Application May 19, 1954, Serial No. 430,782

9 Claims. (Cl. 266—27)

This invention relates to the reductive roasting of manganiferous oxidic iron ores containing substantial amounts, e.g. in excess of 7 percent, of manganese in the form of manganese dioxide whereby to convert the iron oxide contents of the ores to magnetite, $Fe_3O_4$, and the manganese dioxide content thereof to manganous oxide, MnO. The invention concerns improvements to the process and to apparatus for use in carrying out the improved process, with special reference to the preparation of said ores for use in carrying out the leaching process disclosed in U.S. Patent No. 2,608,463, Reginald S. Dean, issued August 26, 1952.

In leaching reduced manganiferous oxidic iron ores with leaching liquors consisting essentially of strongly ammoniacal solutions of ammonium salts, e.g. ammonium carbonate, to produce solutions of ammonio complexes of manganese in which solutions the manganese content is substantially in excess of 10 grams per liter (g./l.), it has been noticed that in the cases of certain reduced ores a substantial fractional part of the manganous oxide content thereof was not extractable with said leaching liquors but remained as such in the solids residue of the leaching step. Thus, it has been noticed that the resulting pregnant solutions contained appreciable amounts of dissolved iron compounds, indicating that a proportion of the oxidic iron content of the reduced ore had been in a form other than $Fe_3O_4$, e.g. in the form of FeO. The failure to extract substantially all of the manganous oxide content of the reduced ore constitutes an economic waste. Moreover, for many purposes it is a distinct disadvantage if the pregnant solution contains a substantial proportion of iron compounds, since in the ensuing precipitation of manganese, as manganese carbonate, from the iron-containing pregnant solution it is practically inescapable that iron compounds are precipitated along with the manganese carbonate to constitute an undesirable impurity in the product.

An object of the present invention is to provide an improved process of reducing manganiferous oxidic iron ores, in preparation of the latter for the Dean leaching process, in such manner that substantially the only oxidic iron compound present therein is magnetite and that substantially all of the manganese content is manganous oxide and, moreover, is in a readily leachable form or state.

It has been found that when the reductive roasting has been effected at an unduly high temperature the resulting manganous oxide is in a form (styled "dead burned") which is not amenable to extraction from the ore by means of the aforesaid leaching solutions. Thus, it has been discovered that if the ore is heated, during the reductive roasting thereof, to a temperature of 1200° F. or in excess thereof, the manganese content—while chemically in the manganous oxide form—in larger or smaller part will be found to have been "dead burned" and poorly leachable. It has been discovered, further, that if the temperature of the roasting ore is not allowed to rise above about 880° F. no "dead burning" occurs; the manganese content is all reduced to a readily leachable form of MnO and the oxidic iron content is all reduced to $Fe_3O_4$.

Accordingly, a further inventive object is the provision of an improved technique of conducting the reductive roasting whereby to avoid the objectionable dead-burning of the manganous oxide. Specifically, it is an object of the invention to provide measures and means for preventing the temperature of the roasting ore from exceeding about 880° F. during the reductive roasting operation.

In accordance with the improved process of the present invention a gravitationally descending column of manganiferous oxidic iron ore, in particulate form, is established and maintained in a shaft-type furnace, and a portion of the upper part of the column is maintained at a desired, relatively low, reduction temperature of the order of 800–880° F. A current of reactive gas mixture, comprising inert gases and carbon dioxide and from about 7 to about 10% of a gaseous reducing agent of the group consisting of hydrogen and carbon monoxide, initially at about room temperature (i.e. initially substantially unheated), is introduced into the lower part of the column and is passed upwardly through the column to the top thereof in countercurrent to the gravitationally descending mass of ore particles constituting the column. In traversing the lower part of the ore particles column the reactive gas mixture absorbs heat from the hot, reductively roasted ore particles occupying the lower part of the column and said particles are correspondingly cooled. As the current of reactive gas mixture continues its counter-current passage through the column it contacts progressively hotter particles until it reaches a zone—in the upper part of the column and at least several inches beneath the stockline—where reduction is actively taking place and where the maximum temperature, of the order of 800°–880° F., of the ore column is experienced. Thereafter, in its passage through the uppermost, overlying, layers of ore particles in the column the reactive gas mixture gives up a large part of its heat to the freshly charged ore and exits from the top of the column at a temperature intermediate the aforesaid maximum temperature and normal room temperature but materially closer to the latter than to the former, e.g. at say 200° F.

In many instances, the exothermicity of the reduction reaction is sufficiently great that—once the process is in operation—no heat from an outside source need be added in order to maintain the desired maximum temperature in the upper part of the column.

The thermal history of the ore particles of the column is as follows: At the stockline, where fresh ore is being added to the top of the column, the ore is at a temperature not substantially higher than room temperature. Its temperature rapidly rises, as it descends through the first foot or so of the column, from such substantially unheated state to the zone of maximum temperature, e.g. 800–880° F. Thereafter, in its further descent through the column, the ore is progressively cooled, by heat transfer to the counter-current of reactive gas mixture, until it attains a temperature of say 100° F. by the time it is removed from the bottom of the column.

In reductively roasting a particulate manganiferous oxidic iron ore analyzing about 10% $MnO_2$ and about 25% Fe as hematite, we prefer so to compose the reactive gas mixture that the same, as introduced into the column in substantially unheated state, contains from about 8 to about 10% of carbon monoxide (or, hydrogen, or mixture of hydrogen and carbon monoxide) about 30% carbon dioxide and the balance inert gases mostly nitrogen. And we prefer to use a sufficient volume of reactive gas mixture, with respect to the amount of ore being roasted, and so to operate that the spent gas mixture exiting from the top of the column analyzes about 1% of carbon dioxide (or equivalent gaseous reducing agent), about 25% $CO_2$ and the balance inert gases plus water vapor.

Because of this appreciable, although small, content of gaseous reducing agent in the spent gas mixture, it is economically feasible to re-use the spent gas mixture rather than to vent it to atmosphere. Accordingly, the process is made a cyclical one, in which a substantial portion of the spent gas mixture is, after being cleaned and cooled, substantially to room temperature and largely dehydrated, fortified with a gas rich in said gaseous reducing agent in an amount to reform the reactivated gas mixture in original composition and volume, and the resulting reformed reactive gas mixture is used as the aforesaid reactive gas mixture in a continuation of the process.

For initiating the process, the ore in the upper part of the column is first heated to the desired reaction temperature, the same being conveniently effected by introducing a current of a suitable heating gas into the column at a level intermediate the top and bottom of the latter, e.g. at about the midpoint, and passing the heating gas upwardly through the upper part of the column. The heating gas may and preferably does largely comprise gaseous products of the combustion of a fluid fuel in an amount of air controlled to yield a non-oxidizing (i.e. "neutral," or slightly reducing) gas mixture.

In the event the ore being roasted is so deficient in exothermically reducible components that the aforesaid zone of maximum temperature is not maintained at the desired level, e.g. at 800–880° F., solely by the exothermic heat of the reduction, the realized heating from this latter source may be supplemented by heat imported into said zone from an outside source. Advantageously, this may be effected by introducing a neutral, or slightly reducing heating gas into the column at a level intermediate the top and bottom of the later, e.g. at about the midpoint, and causing the heating gas to mingle with and to pass upwardly through the upper part of the column with the aforesaid reactive gas mixture, the temperature and volume of said heating gas mixture being so controlled as to supplement the exothermic heat of reaction to maintain the aforesaid zone of maximum temperature at the desired temperature level, e.g. at 800–880° F.

In such event, the heating gas mixture preferably consists of an admixture of (1) hot, non-oxidizing substantially neutral gaseous products of the combustion of a fluid flue in a controlled amount of air with (2) a cleaned, cooled and at least partially dehydrated portion of the spent gas mixture, the two components being admixed in such proportions as to yield the desired volume of gas mixture at the desired temperature level, e.g. 800°–880° F. Advantageously, component 1 above may be the same as, and derived from the same source as, the heating gas used for heating the upper part of the column in initiating the operation. The volume and temperature of this heat-supplementing gas mixture—in situations where use of the same is necessary or advisable—are varied in accordance with variations in the temperature of the zone of maximum temperature resident in the upper part of the ore column.

In one specific instance of the carrying out of the process of this invention, in the reductive roasting of 22,400 pounds per hour of a manganiferous oxidic iron ore material analyzing about 10% $MnO_2$ and 25% Fe as hematite, about 1500 cu.ft./min. of reactive gas mixture, at 65° F., analyzing 8% CO and 20% $CO_2$ were introduced into and countercurrently passed through the column from adjacent the bottom upwardly to the top thereof. At the midpoint, about 3100 cu.ft./min. of heating gas mixture were added, the mixture being at a temperature of about 800° F. and consisting of one part of neutral hot gaseous combustion products initially at a temperature of about 4000° F. tempered with five to six parts of waste top gas at a temperature of about 65° F. The maximum temperature attained in the ore column was between 800° and 880° F. The waste top gas was discharged at 200° F., and analyzed about 1% CO and about 25% $CO_2$. The reduced ore was discharged at 100° F.: all of its manganese was in the form of MnO of which about 95% was readily leachable, and all of its iron content was in the form of $Fe_3O_4$. A portion of the waste top gas was scrubbed and cooled in a packed water tower to normal room temperature and to it was added producer gas containing about 38% of carbon monoxide. The relative amounts of these components were adjusted to reform the reactive gas mixture in composition and volume, and the mixture was used in the continuation of the process.

The apparatus aspect of the present invention will now be described with reference to the accompanying drawings, in which Figures 1a and 1b in conjunction illustrate, partly in section and partly in front elevation, with parts broken away, a preferred form of reducing furnace for use in carrying out the improved process of the invention;

Figure 2 is a section taken on line 2—2 of Figure 1a showing the construction of the furnace at the midpoint;

Figure 3 is a sectional view taken on line 3—3 of Figure 1a showing the construction at the top or infeed end of the reducing furnace proper;

Figure 4 is a sectional view taken on line 4—4 of Figure 1b;

Figure 5 is a sectional view taken on line 5—5 of Figure 1b;

Figure 6 is a fragmentary sectional view taken on line 6—6 of Figure 5, showing the disposition of the conduits and louvers for introducing reactive gas mixture into the ore column adjacent the bottom of the latter;

Figure 7 is a sectional view taken on line 7—7 of Figure 1b;

Figure 8 is a sectional view taken on line 8—8 of Figure 5;

Figure 9 is a sectional view taken on line 9—9 of Figure 1b showing the construction of the sealing means at the bottom of the furnace proper; and Figure 10 is a schematic representation of the reducing furnace of the present invention and its relation to its appurtenances.

Figure 1A:
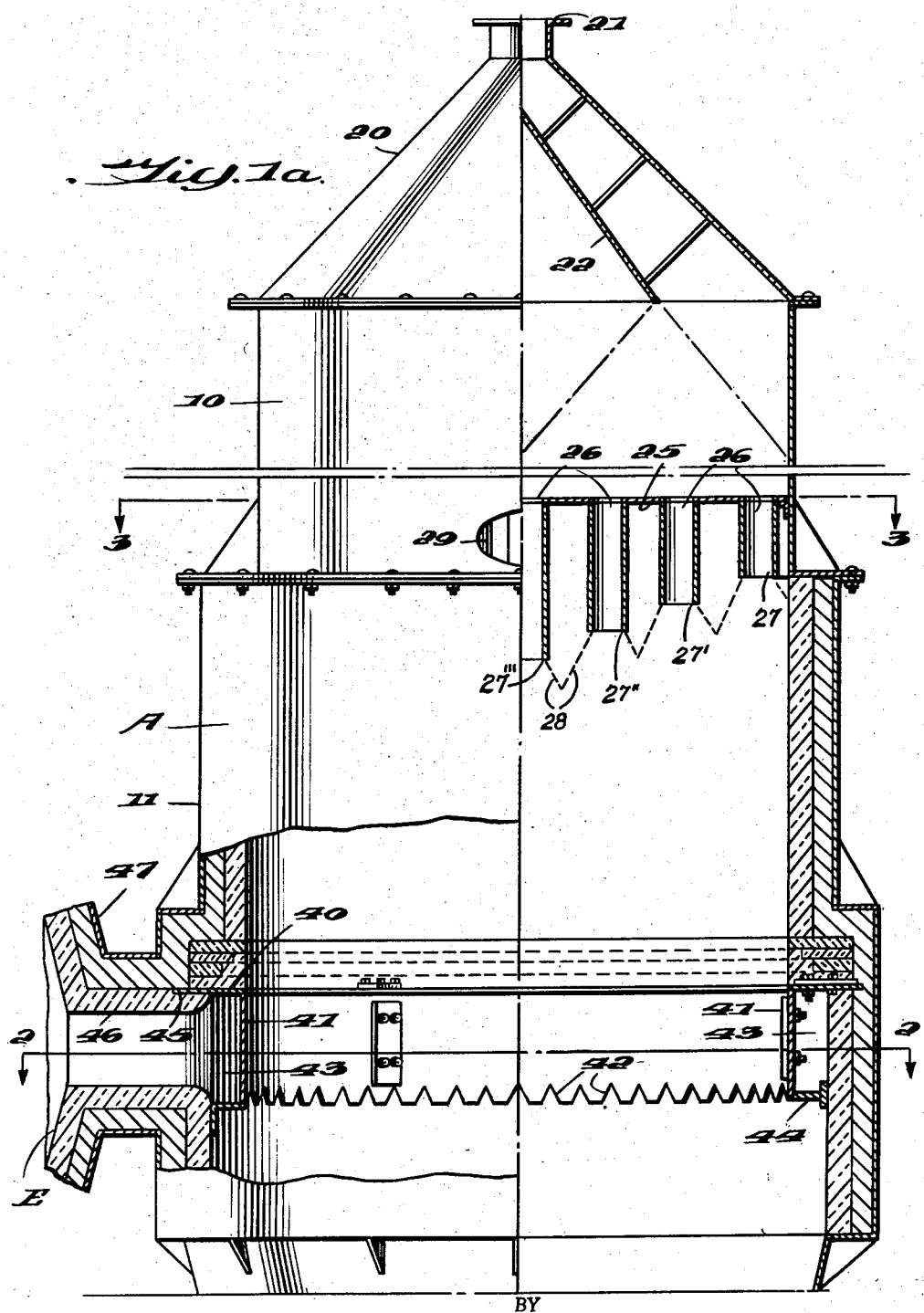

Referring first to Fig. 10, it will be seen that the reducing furnace A is supplied at a zone in the lower part of the furnace proper, with a reducing mixture of gases which have been forced by variable flow blower N into and through cooler B wherein they are cooled and made homogeneous, the mixture being composed of (1) rich reducing gas produced in gas producer C and scrubbed in scrubber D, and (2) a portion of waste gas from the top of furnace A which waste gas portion has been led from the furnace through conduit H and scrubber J. As will be appreciated, reactive gas mixture introduced into the furnace from cooler B is passed upwardly through the column to the top of the latter. For initially heating the upper part of the ore column in furnace A, and for—when necessary—supplementing the exothermic reaction heat with heat from an outside source, combustion and mixing chamber E is supplied with (3) substantially neutral, non-oxidizing gaseous products of the combustion of fuel oil, from source F, in a controlled amount of air furnished by variable flow blower G admixed, in chamber E, with (4) a portion of cooled waste gas from scrubber J. Another portion of waste gas from scrubber J is led by means of variable speed blower L through cooler M to the bottom of furnace A proper for sealing the solids discharge end of furnace A against unwanted downward escape of reactive gas mixture. For rendering operation of gas producer C automatic or at least semi-automatic, a system of controls O and P in, respectively, the line delivering reactive gas mixture from cooler B to the lower part of the furnace proper, and the line delivering waste gas from scrubber J operate conjointly through control Q to vary, as desired, the rate of operation of variable flow blower R which forces a current of air into gas producer C.

In conjoint Figures 1a and 1b, the complete reducing furnace is seen to comprise a generally cylindrical hopper 10 surmounting and in communication with a generally cylindrical uper or reducing zone part 11 of the furnace proper, a generally conical lower or cooling zone part 12 of the furnace proper terminating in sealing means 13, and an elongated discharge main 14 in communication with the sealing means 13. At its lower end discharge main 14 is associated with a conventional vibrating discharge means (not shown) for continuously removing treated solids from discharge main 14 at a controlled, variable rate.

Hopper 10 is provided with a generally conical cover 20 provided at its upper or apex end with an axially disposed ore feed inlet 21. Within the conical cover of the hopper there is suspended a generally conical, axially disposed distributor 22 for distributing ore particles within hopper 10.

At its base, hopper 10 is provided with an apertured base plate 25 (see Fig. 3) in which are formed a plurality of spaced apertures 26, 26. Fixed to the underside of base plate 25 and in association with apertures 26, 26 are a plurality of open-ended feed tubes 27, 27', 27'', 27''' in communication with the space within furnace part 11 and terminating adjacent the upper end of the latter. Ore particles from a constant supply thereof in hopper 10 feed by gravity through feed tubes 27, 27', 27'', 27''' and, after discharge from the latter, take an angle of repose therebeneath, so as to provide a stockline—of an ore column occupying the space of the furnace proper—characterized by a profile composed of a plurality of merging generally conical piles of ore particles, above which stockline and between which feed tubes there exists a relatively large free space 28, 28 for the ready egress of gases from the top of the ore column. This free space is in communication with the exterior of the furnace through gas discharge aperture 29, from which aperture waste gas conduit H (see Fig. 10) is led to scrubber J.

The above described assembly of base plate and feed tubes functions to prevent segregation of fine and coarse particles and to provide a uniform delivery of a homogeneous ore feed to the ore column of the furnace. Preferably, the more centrally located of the uniformly spaced 6-inch diameter feed tubes (35 of which are indicated) for delivering non-segregated ore uniformly onto the top of the ore column are made about 6 inches longer than are the feed tubes adjacent the periphery of base plate 25, for the purpose of imposing a "dished" profile on the stockline of the column in order to establish paths of equal length for gas to travel from any point about the periphery 42 to any point on the stockline thereby equalizing gas pressure from center to periphery. This feature is shown in Fig. 1a wherein the "dished" profile is attained by the use of feed tubes having progressively increasing lengths in the direction from the periphery to the center of the base plate, the outermost array of tubes 27 being the shortest, the next inner array of tubes 27' being somewhat longer, with progressively longer tubes 27'' nearer the center and the longest tubes 27''' nearest the center of the base plate.

Adjacent the midpoint of the furnace proper there is provided a means for introducing inert heating gas into the ore column. The same is composed of a horizontal annular or ringlike member 40 within and supported by the furnace wall and a circular band 41 secured to, and having a diameter equal to the inner diameter of, annular member 40. The lower edge of band 41 is serrated as shown at 42, 42, so as to provide a multiplicity of gas entrances into the ore column from the annular open-bottomed free space 43 defined by the furnace wall, the annular member 40 and circular band 41. These serrations have been formed to promote uniform introduction of gas into the ore column about its periphery.

It is to be remarked that the furnace wall adjacent ringlike member 40 is expanded so that the inner surface of band 41 is substantially flush with the wall of part 11 and annular free space 43 surrounds an unrestricted ore column. This construction promotes uniform descent of the mass of ore as well as uniform ingress of gases into the ore mass. Band 41 is stayed in place, against accidental displacement by the pressure of the ore mass, by means of a plurality of spaced stay members 44, 44 bearing against the furnace wall.

Into an orifice 45 provided in the furnace wall opposite free space 43 there is fitted a relatively short gas main 46 which provides communication between free space 43 and chamber E, i.e. a source of hot, non-oxidizing, substantially neutral gases, a portion 47 of the end wall of chamber E being shown. As is indicated in Fig. 10, the actual combustion of fuel oil in air is initiated and largely concluded in a relatively small antechamber 48 attached to the end wall of and in communication with the free space within chamber E, whilst main body of chamber E is a mixing chamber for mingling the gases from antechamber 48 with waste gas supplied through conduit 29.

Intermediate the midpoint and the bottom of the furnace proper there is provided a means for introducing reactive gas mixture into the ore column. This includes, in combination, a circular bustle pipe 50 surrounding the wall of conical part 12 and a plurality of spaced, radially disposed inlet conduits 51, 51, communicating with the bustle pipe and terminating at their inwardly extending open ends beneath and in communication with an axially disposed louver means 52 which is surmounted by a steeply conical protective cover member 53, which cover member is fixed to and supported by conduits 51, 51. As shown in Figs. 4 and 7, the conduits 51, 51 are, adjacent their inwardly extending ends, open from beneath, whereby to expedite the ingress of gases into the ore mass surrounding said conduits. Bustle pipe 50 is in communication with cooler B through reactive gas conduit 54.

Surrounding the lower, apex, end of conical portion 12 of the furnace proper is a sealing means—represented generally as 13 in Fig. 1b of the drawing—for preventing downward leakage of reactive gas mixture out of the bottom of the furnace. The same is a generally cylindrical hopper-shaped vessel having a daimeter larger than the discharge orifice 60 of the furnace proper and being provided at its upper edge with an outstanding flange 61 which is bolted to a corresponding flange 62 fixed to the furnace wall. An aperture 63 is let into vessel 13 adjacent the upper edge of the latter, through which aperture communication is had between conduit 64 and the free space 65, within vessel 13, created by flange 62, the wall of vessel 13 and the sloping free surface of the mass of ore moving out of discharge orifice 60 into vessel 13. Through conduit 64 cool waste gas is passed into free space 65.

The bottom portion 66 of vessel 13 is conical and at its lower, apex, end is attached to discharge main 14 for gravitational passage thereinto of roasted and cooled ore. As was noted hereinbefore, a conventional means, e.g. a syntron feeder (not shown), for continuously removing ore from the bottom of main 14 at a controlled variable rate is associated in gas-tight manner with the bottom of main 14.

In operation, the managaniferous ore to be roasted is delivered to the apparatus through feed inlet 21 and is distributed by distributor 22 over a body of ore resident in hopper 10. The functioning of an ore discharge device (not shown) at the bottom of discharge main 14 causes a gravitational progression of ore downwardly through feed tubes 27, 27', 27'', 27''' onto the top of a column of ore resident in the furnace proper and through the latter to and through discharge main 14. Reactive gas mixture, at about room temperature, from cooler B is forced into, and upwardly through, the ore column by way of reactive gas conduit 54, bustle pipe 50, conduits 51, 51 and louver means 52. The so-introduced reactive gas mixture passes uninterruptedly through substantially the whole ore column, i.e., all that part of the ore column which lies above the level of louver means 52. The waste gas mixture which has traversed the upper part of the ore column finds egress therefrom into free space 28, 28 and thence, by way of aperture 29 and waste gas conduit H to scrubber J. In this latter the waste gas mixture is scrubbed with water, thereby being cleaned, deprived of some of its contained water vapor and to a considerable extent cooled.

Waste gas from scrubber J is divided into three portions which are diverted as follows: one portion if forced—in association with producer gas from gas producer C—by blower N through cooler B and thence by way of conduit 54 to bustle pipe 50; a second portion is forced by blower L through cooler M and thence by way of conduit 64 into sealing means 13 sealing the bottom of the furnace proper; and a third portion is forced by blower K by way of conduit 49 to and through chamber E—wherein it is admixed with hot gaseous products of combustion in antechamber 48—and thence by way of gas main 46 into free space 43 surrounding the ore column. Any excess of waste gas, over and above what is needed to supply the three demands just noted, may be exhausted to atmosphere as conventionally indicated in line H, Fig. 10.

Sealing means 13 functions to prevent downward leakage of reactive gas mixture through discharge orifice 60 in the following manner: the pressure of the gas within louver means 52 is constantly or intermittently measured by conventional gas pressure-measuring means (not shown). There is imposed on the gas in free space 65 of sealing means 13, through appropriate control of the rate of operation of blower L, a pressure which is slightly, e. g., one or two inches of water, greater than that measured at the louver means. Thereby it is insured that any "leakage" taking place at the bottom of the furnace proper is leakage of a very small amount of waste gas into the system rather than leakage of reactive gas mixture out of the system. The reduced and cooled ore departs from the furnace in an atmosphere of unheated waste gas.

Cooler B is supplied not only with scrubbed waste gas, from scrubber J, but also with a controlled variable amount of producer gas from a conventional producer gas generator C which may be—and in the present installation is—a well-known Wellman-Galuska producer gas generator in which moist air is passed over red-hot cake.

Illustrative of the invention, the present furnace has an inside diameter of 9 feet at the cylindrical part 11. This latter has a height of 9 feet, measured from the lower ends of feed tubes 27, 27', 27'', 27'''—the peripheral members of which have a height of 16 inches— to the serrated lower edge of band 41, with a 27 inch extension beneath said band. Conical part 12 has a base diameter of 9 feet, is 19 feet in height, and its apex discharge orifice 60 has a diameter of 18 inches. Louver means 52 is located about 8 feet above the apex discharge orifice 60. The diameter of sealing means 13 is 31 inches, while the discharge main has a diameter of 10 inches and a height of 4 feet. The cross-sectional dimensions of free space 43, disregarding the angularity of the free surface of the ore column beneath band 41, are: height 24 inches and width 6 inches.

We claim:

1. A generally vertical shaft-type ore reducing furnace having a generally cylindrical upper part and a lower part in the general form of an inverted truncated cone the apex end of which is provided with a discharge orifice for reduced ore, a hopper above and in direct communication with said cylindrical upper part and having a bottom part substantially co-extensive in area with the cross-sectional area of said cylindrical upper part, said hopper being provided at its bottom part with means for continuously gravitationally feeding ore from said hopper into the furnace and distributing the same over the top of a column of ore within the furnace said ore feeding and distributing means defining a top free space between the hopper base and the top of such ore column, a first gas-introducing means adjacent the lower end of said cylindrical upper part for introducing a current of hot neutral gas into and for forcing the same upwardly through the upper part of such ore column to said top free space, a second gas-introducing means spaced substantially below said first gas-introducing means and intermediate the base and the apex end of said inverted conical lower part for introducing a current of substantially unheated reactive gas into and for forcing such gas upwardly through such ore column to said top free space, and sealing means adjacent said discharge orifice for preventing downward passage of reactive gas through said orifice, said sealing means including means for forcing a current of cool inert gas upwardly through said orifice at a pressure at least as great as is the gas pressure within the apex portion of the lower part of the furnace.

2. The combination of a generally vertical shaft-type ore reducing furnace having a generally cylindrical upper part, a hopper above and in direct communication with said upper part, the bottom part of said hopper having an area substantially coextensive with the cross-sectional area of the upper part of the furnace, and means for feeding ore into said hopper, with means for gravitationally feeding ore uniformly into the top of the furnace and for maintaining a top free space between the bottom part of the hopper and the top of such ore column, said feeding space-maintaining means comprising an apertured base plate adjacent the bottom of the hopper, the apertures being of a size to pass ore particles and spaced uniformly over said base plate, and a plurality of open-ended feed tubes, having diameters corresponding to those of the apertures, secured to the base plate in communication with said apertures, and depending into the top of the cylindrical upper part of the furnace, said apertures and feed tubes being sufficiently numerous and the feed tubes being of such lengths with respect to each other as to deliver ore from said hopper uniformly and without substantial segregation onto the stockline of such ore column and to maintain a predetermined profile of such stockline spaced from the hopper base.

3. The combination of a generally vertical shaft-type ore-reducing furnace having a generally cylindrical upper part and being provided with means for establishing and maintaining within the same a gravitationally descending column of ore, with means for heating the upper part of a column of ore resident in the furnace which comprises a horizontal imperforate annular member disposed transversely within and supported by the furnace wall adjacent the base of the generally cylindrical upper part of the furnace, an imperforate circular band secured to and depending from said annular member, the annular member, the band and the furnace wall adjacent said band cooperating to define an annular open-bottomed free space encircling such ore column, an orifice in the furnace wall contiguous with said free space, and means remote from the furnace and communicating with said free space by way of said orifice for introducing a current of heating gas into said free space, the lower edge of said band being serrated to provide a multiplicity of gas entrances into such ore column from said free space.

4. The combination of a generally vertical shaft-type reducing furnace having a generally cylindrical upper part and a generally conical lower part, the furnace being provided with means for establishing and maintaining within the same a gravitationally descending column of ore, with means for passing a current of reactive gas upwardly through the greater part, including at least the upper part, of a column of ore resident in the furnace which comprises a bustle pipe encircling the generally conical lower part of the furnace at a level intermediate the upper and lower ends of the latter, an axially disposed louver means supported within the generally conical lower part of the furnace at a level intermediate the upper and lower ends of the latter, a plurality of spaced, radially disposed inlet conduits communicating with said bustle pipe and extending through the furnace wall and terminating at their inwardly extending open ends beneath and in communication with said axially disposed louver means, and means for delivering to said bustle pipe a current of reactive gas under pressure.

5. The combination of a generally vertical shaft-type reducing furnace, having a generally cylindrical upper part and a generally conical lower part, said furnace being provided with means for establishing and maintaining within the same a gravitationally descending column of ore and means, intermediate the bottom and the top of the furnace, for introducing into the same a current of reducing gas under pressure, with means for sealing the bottom of the furnace against leakage of gas out of the same which comprises a generally cylindrical hopper shaped vessel having a diameter larger than that of the apex end of the conical lower part of the furnace, an outstanding flange fixed to said apex end, means for securing said vessel to said flange in gas-tight relation, an elongated discharge tube depending from and communicating with the hopper bottom of said vessel, means for maintaining a column of ore within said tube and a substantial part of said vessel, said flange, the upper part of said vessel and such ore column defining an annular free space adjacent the apex end of said conical part, an aperture in the wall of the vessel communicating with said annular free space, and means for introducing a current of cool waste gas through said aperture and into said free space under pressure.

6. The combination of a generally vertical shaft-type furnace for use in reducing ores with means for maintaining in the shaft of the furnace an ore column of predetermined height, said ore column-maintaining means comprising a hopper above and in communication with the upper end of the furnace shaft, an apertured base plate in said hopper the apertures being of a size to pass ore particles and spaced throughout the area of said base plate, an ore inlet in the top of said hopper for delivering ore onto the base plate, and a plurality of open-ended feed pipes secured to the base plate in communication with said apertures and depending into the top of the furnace shaft for delivery from said hopper of a plurality of spaced deposits of ore onto the stockline of an ore column occupying that part of the furnace shaft beneath the lower ends of said feed pipes.

7. Apparatus as defined in claim 6, wherein said feed tubes are of progressively increasing length in the direction from the periphery to the center of said base plate, thereby to establish and maintain a dished profile to the stockline of such ore column.

8. Apparatus as defined in claim 6, wherein the ore inlet to the hopper is disposed axially of the latter, and a generally conical axially disposed distributor is supported intermediate the ore inlet and base plate and in such relation to the latter as to deliver onto the same an annular mound of ore covering all of said apertures.

9. The combination of a generally vertical shaft-type ore reducing furnace having means for establishing and maintaining therein a gravitationally descending column of the ore and means intermediate the top and bottom of said shaft for introducing a reducing gas into such ore column for upward passage of such gas through at least the upper part of such column with means for sealing off the bottom of said shaft against downward leakage therefrom of reducing gas, said sealing means including a hopper shaped vessel secured in gas-tight manner beneath and in communication with said furnace for reception of ore descended out of the latter, said vessel cooperating with such descended ore to define an annular open space about such descended ore, and means for introducing into said open space a sealing gas under a pressure at least as great as is the downward pressure of said reducing gas through such ore column.

References Cited in the file of this patent

UNITED STATES PATENTS

| | | |
|---|---|---|
| 2,195,866 | Le Clarick | Apr. 2, 1940 |
| 2,249,410 | Wilson | July 15, 1941 |
| 2,339,192 | Roberson | Jan. 11, 1944 |
| 2,345,067 | Osann | Mar. 28, 1944 |
| 2,528,553 | Royster | Nov. 7, 1950 |
| 2,539,485 | Schoenlaub | Jan. 30, 1951 |
| 2,591,789 | De Jahn | Apr. 8, 1952 |
| 2,648,600 | Reeve | Aug. 11, 1953 |
| 2,739,800 | Sisco | Mar. 27, 1956 |

FOREIGN PATENTS

| | | |
|---|---|---|
| 554,182 | Great Britain | June 23, 1943 |
| 586,819 | Great Britain | Apr. 1, 1947 |
| 659,899 | Great Britain | Oct. 31, 1951 |